(12) United States Patent
Kursun

(10) Patent No.: US 11,461,702 B2
(45) Date of Patent: Oct. 4, 2022

(54) METHOD AND SYSTEM FOR FAIRNESS IN ARTIFICIAL INTELLIGENCE BASED DECISION MAKING ENGINES

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 974 days.

(21) Appl. No.: 16/209,384

(22) Filed: Dec. 4, 2018

(65) Prior Publication Data
US 2020/0175424 A1 Jun. 4, 2020

(51) Int. Cl.
*G06N 20/20* (2019.01)
*G06K 9/62* (2022.01)

(52) U.S. Cl.
CPC ........... *G06N 20/20* (2019.01); *G06K 9/6256* (2013.01)

(58) Field of Classification Search
CPC ........ G06N 20/00; G06N 20/10; G06N 20/20; G06K 9/6255; G06K 9/6256; G06K 9/6257
See application file for complete search history.

(56) References Cited

U.S. PATENT DOCUMENTS

| | | | |
|---|---|---|---|
| 5,182,793 A | 1/1993 | Alexander et al. | |
| 5,473,732 A | 12/1995 | Chang | |
| 6,366,193 B2 | 4/2002 | Duggal et al. | |
| 6,553,355 B1 | 4/2003 | Arnoux et al. | |
| 6,738,753 B1 | 5/2004 | Hogan | |
| 6,842,674 B2 | 1/2005 | Solomon | |
| 7,218,974 B2 | 5/2007 | Rumi et al. | |
| 7,321,883 B1 | 1/2008 | Freedy et al. | |
| 7,577,623 B2 | 8/2009 | Genty et al. | |
| 7,769,705 B1 | 8/2010 | Luechtefeld | |
| 8,234,423 B2 | 7/2012 | Liu et al. | |
| 2003/0005081 A1 | 1/2003 | Hunt | |
| 2003/0101151 A1 | 5/2003 | Holland | |
| 2004/0143559 A1 | 7/2004 | Ayala | |
| 2006/0036632 A1 | 2/2006 | Williams | |
| 2006/0179022 A1 | 8/2006 | Holland | |
| 2007/0009155 A1 | 1/2007 | Potts et al. | |
| 2011/0106548 A1* | 5/2011 | Hayden | G06Q 10/10 705/1.1 |

(Continued)

*Primary Examiner* — Shane D Woolwine
(74) *Attorney, Agent, or Firm* — Moore & Van Allen PLLC; James C. Edwards

(57) ABSTRACT

The present disclosure is directed to a novel system for generating expansion artificial intelligence (AI) based decision making engines to improve overall AI solution fairness, reduce bias and reduce discrimination in outcomes. Embodiments perform a restriction stage that includes generating an initial AI solution, perform an expansion stage by generating a plurality of artificial intelligence expansion engines by modifying the starting state to determine a new starting state for each; modifying the set of criteria to determine a new set of criteria, using the new starting state and the new set of criteria to generate an expansion AI solution; and joining the initial AI solution of the restriction engine with the plurality of expansion AI solutions to generate an ensemble AI solution. This solution may be refined by a restriction stage and the expansion and/or restriction stages may be reiterated as desired.

20 Claims, 5 Drawing Sheets

(56) References Cited

U.S. PATENT DOCUMENTS

2014/0279800 A1   9/2014  Anastasopoulos
2017/0330058 A1* 11/2017  Silberman ............ G06K 9/6221
2018/0211117 A1   7/2018  Ratti
2018/0315499 A1  11/2018  Appelbaum et al.

* cited by examiner

METHOD AND SYSTEM FOR FAIRNESS IN ARTIFICIAL INTELLIGENCE BASED DECISION MAKING ENGINES

FIELD OF THE INVENTION

The present disclosure embraces a system, computer program product, and computer-implemented method for fairness in artificial intelligence based decision making engines.

BACKGROUND

Current techniques for artificial intelligence are based solely on historical data, which may be flawed in a variety of ways. Therefore, a system which minimizes those faults by expanding the methods by which artificial intelligence engines are generated is needed.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for generating expansion artificial intelligence (AI) based decision making engines to improve overall AI solution fairness, reduce bias and reduce discrimination in outcomes. Embodiments perform a restriction stage that includes generating an initial AI solution, perform an expansion stage by generating a plurality of artificial intelligence expansion engines by modifying the starting state to determine a new starting state for each; modifying the set of criteria to determine a new set of criteria, using the new starting state and the new set of criteria to generate an expansion AI solution; and joining the initial AI solution of the restriction engine with the plurality of expansion AI solutions to generate an ensemble AI solution. This solution may be refined by a restriction stage and the expansion and/or restriction stages may be reiterated as desired.

Accordingly, embodiments of the present disclosure provide a system for generating expansion artificial intelligence (AI) based decision making engines to improve overall AI solution fairness, reduce bias and reduce discrimination in outcomes. The system may comprise a processor; a communication interface; and a memory having executable code stored thereon. The executable code, when executed by the processor, may cause the processor to perform a restriction stage comprising executing an artificial intelligence restriction engine, such that when executed, the AI restriction engine causes the processor to generate an initial AI solution. The executable code also causes the processor to access a predetermined starting state of the initial AI solution, access a predetermined set of criteria to be applied during AI optimization of the initial AI solution; and perform an expansion stage by generating a plurality of artificial intelligence expansion engines by, for each AI expansion engine: modifying the starting state to determine a new starting state for each of the plurality of AI expansion engines; modifying the set of criteria to determine a new set of criteria for each of the plurality of AI expansion engines; for each of the plurality of AI expansion engines, execute the expansion engine, that when executed, causes the processor to: use the new starting state and the new set of criteria to generate an expansion AI solution; and join the initial AI solution of the restriction engine with the plurality of expansion AI solutions of the plurality of expansion engines to generate an ensemble AI solution.

In some embodiments, the executable code further causes the processor to perform a second restriction stage by executing a second restriction engine to refine the ensemble AI solution, resulting in a refined ensemble AI solution.

In some such embodiments, the second restriction engine refines the ensemble AI solution based on ensemble AI solution performance or experimental results.

In some embodiments, the executable code further causes the processor to dynamically modify the set of criteria to determine the new sets of criteria for the plurality of each of the plurality of AI expansion engines based on: (i) a number of the plurality of AI expansion engines, (ii) policies for at least a portion of the new sets of criteria, (iii) machine learning for at least a portion of the new sets of criteria, (iv) randomly generating at least a portion of the new sets of criteria, (v) enforcing an output set of criteria, (vi) modifying optimization criteria, and/or (vii) modifying a champion/challenger mode.

In some embodiments, the executable code further causes the processor to modify the set of criteria to determine a new set of criteria for each of the plurality of AI expansion engines by: inserting an (i) intentional compensation factor based on non-selected or starved population, (ii) variation of a cost function, (iii) variation of a loss function, and/or (iv) variation of input data by synthetic data. In some embodiments, the executable code further causes the processor to modify the set of criteria to determine a new set of criteria for each of the plurality of AI expansion engines by: inserting random criteria into one or more of (i) intentional compensation factor, (ii) cost function variation, (iii) loss function variation, and/or (iv) synthetic data variation of input data.

In some embodiments, the executable code further causes the processor to dynamically perform a plurality of recurrent expansion stages and restriction stages to determine dynamic sets of expansion criteria and restriction criteria to further refine the ensemble AI solution.

In some such embodiments, dynamically performing the plurality of recurrent expansion and restriction stages is based at least in part on a set of overall system criteria comprising expansion degrees, restriction degrees, and/or recurrence cycle lengths.

In other such embodiments, the executable code further causes the processor to: calculate a next iteration expansion profile and a next iteration restriction profile; wherein the next iteration expansion profile comprises second new sets of expansion criteria for application during a next expansion stage; and wherein the next iteration restriction profile comprises new sets of restriction criteria for application during a next restriction stage.

In some such embodiments, the executable code further causes the processor to: compare performance of the refined AI solution to the initial AI solution from the restriction engine; if performance of the refined AI solution surpasses performance of the initial AI solution, retain the refined AI solution as a working solution; and if performance of the initial AI solution surpasses performance of the refined AI solution, use the initial AI solution as the working solution.

In some of these embodiments, the executable code further causes the processor to: in response to using the initial AI solution as the working solution, automatically perform recurrence of the expansion stage to determine second new sets of criteria for a new plurality of AI expansion engines.

According to embodiments of the invention, a controller for generating expansion artificial intelligence (AI) based decision making engines to improve overall AI solution fairness, reduce bias and reduce discrimination in outcomes, includes a processor communicatively coupled to a communication interface and a memory having executable instructions stored thereon, where the executable code, when executed by the processor, causes the processor to: perform a restriction stage comprising executing an artificial intelligence restriction engine, such that when executed, the AI restriction engine causes the processor to: generate an initial AI solution. The executable instructions further cause the processor to access a predetermined starting state of the initial AI solution; access a predetermined set of criteria to be applied during AI optimization of the initial AI solution; perform an expansion stage by generating a plurality of artificial intelligence expansion engines by, for each AI expansion engine: modifying the starting state to determine a new starting state for each of the plurality of AI expansion engines; modifying the set of criteria to determine a new set of criteria for each of the plurality of AI expansion engines; for each of the plurality of AI expansion engines, execute the expansion engine, that when executed, causes the processor to: use the new starting state and the new set of criteria to generate an expansion AI solution; and join the initial AI solution of the restriction engine with the plurality of expansion AI solutions of the plurality of expansion engines to generate an ensemble AI solution.

In some embodiments, the executable code further causes the processor to: perform a second restriction stage by executing a second restriction engine to refine the ensemble AI solution, resulting in a refined ensemble AI solution.

In some such embodiments, the second restriction engine refines the ensemble AI solution based on ensemble AI solution performance or experimental results.

In some embodiments, the executable code further causes the processor to: dynamically modify the set of criteria to determine the new sets of criteria for the plurality of each of the plurality of AI expansion engines based on: (i) a number of the plurality of AI expansion engines, (ii) policies for at least a portion of the new sets of criteria, (iii) machine learning for at least a portion of the new sets of criteria, (iv) randomly generating at least a portion of the new sets of criteria, (v) enforcing an output set of criteria, (vi) modifying optimization criteria, and/or (vii) modifying a champion/challenger mode.

In some embodiments, the executable code further causes the processor to: modify the set of criteria to determine a new set of criteria for each of the plurality of AI expansion engines by: inserting an (i) intentional compensation factor based on non-selected or starved population, (ii) variation of a cost function, (iii) variation of a loss function, and/or (iv) variation of input data by synthetic data.

In some such embodiments, the executable code further causes the processor to: modify the set of criteria to determine a new set of criteria for each of the plurality of AI expansion engines by: inserting random criteria into one or more of (i) intentional compensation factor, (ii) cost function variation, (iii) loss function variation, and/or (iv) synthetic data variation of input data.

In some embodiments, the executable code further causes the processor to: dynamically perform a plurality of recurrent expansion stages and restriction stages to determine dynamic sets of expansion criteria and restriction criteria to further refine the ensemble AI solution.

In some such embodiments, dynamically performing the plurality of recurrent expansion and restriction stages is based at least in part on a set of overall system criteria comprising expansion degrees, restriction degrees, and/or recurrence cycle lengths.

According to embodiments of the invention, a computer-implemented method for generating expansion artificial intelligence (AI) based decision making engines to improve overall AI solution fairness, reduce bias and reduce discrimination in outcomes includes performing a restriction stage comprising executing an artificial intelligence restriction engine, such that when executed, the AI restriction engine causes the processor to: generate an initial AI solution. The method also includes accessing a predetermined starting state of the initial AI solution; accessing a predetermined set of criteria to be applied during AI optimization of the initial AI solution; and performing an expansion stage by generating a plurality of artificial intelligence expansion engines by, for each AI expansion engine: modifying the starting state to determine a new starting state for each of the plurality of AI expansion engines; modifying the set of criteria to determine a new set of criteria for each of the plurality of AI expansion engines; for each of the plurality of AI expansion engines, execute the expansion engine, that when executed, causes the processor to: use the new starting state and the new set of criteria to generate an expansion AI solution; and join the initial AI solution of the restriction engine with the plurality of expansion AI solutions of the plurality of expansion engines to generate an ensemble AI solution.

Embodiments of the invention provide a system for dynamically generating a new artificial intelligence (AI) based solution or variation of an initial AI solution with improved fairness, reduced bias and reduced discrimination in outcomes, comprising a processor; a communication interface; and a memory having executable code stored thereon, wherein the executable code, when executed by the processor, causes the processor to dynamically modify initial criteria of an initial AI solution, the modifying based at least in part on policy, machine learning and/or enforced randomness, wherein the modification includes one or more iterations of: (i) expansion; and (ii) restriction and/or relaxation, thereby resulting in modified criteria; create a new AI engine configured to use the modified criteria to generate a new AI solution configured to provide improved fairness, reduced bias and reduced discrimination.

Embodiments of the invention provide a computer-implemented method for dynamically generating a new artificial intelligence (AI) based solution or variation of an initial AI solution with improved fairness, reduced bias and reduced discrimination in outcomes. The method includes dynamically modifying initial criteria of an initial AI solution, the modifying based at least in part on policy, machine learning and/or enforced randomness, wherein the modification includes at least one iteration of: (i) expansion; and (ii) restriction and/or relaxation, thereby resulting in modified criteria; creating at least one new AI engine configured to use the modified criteria to generate a new AI solution configured to provide improved fairness, reduced bias and reduced discrimination.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
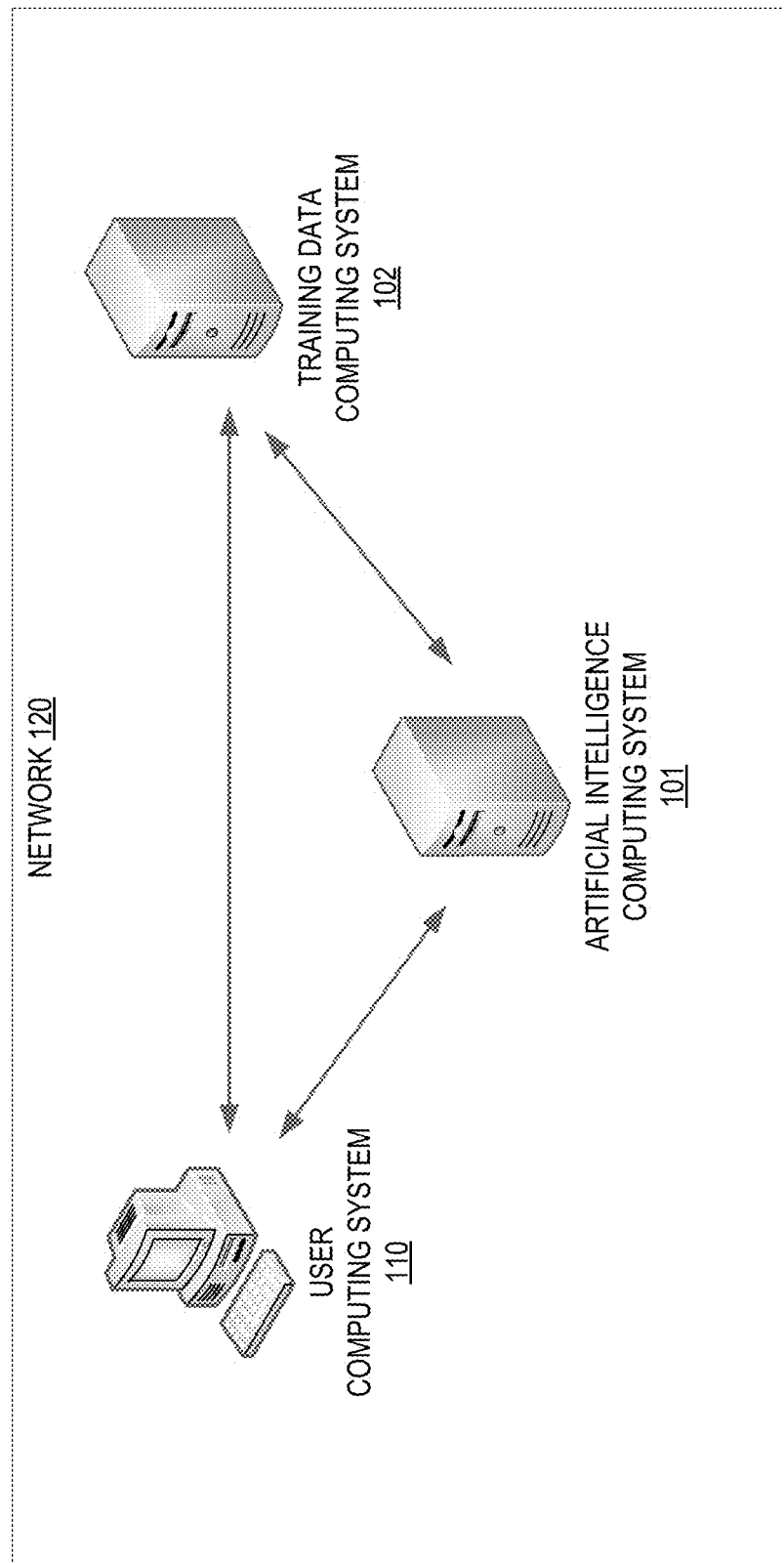
Figure 2:
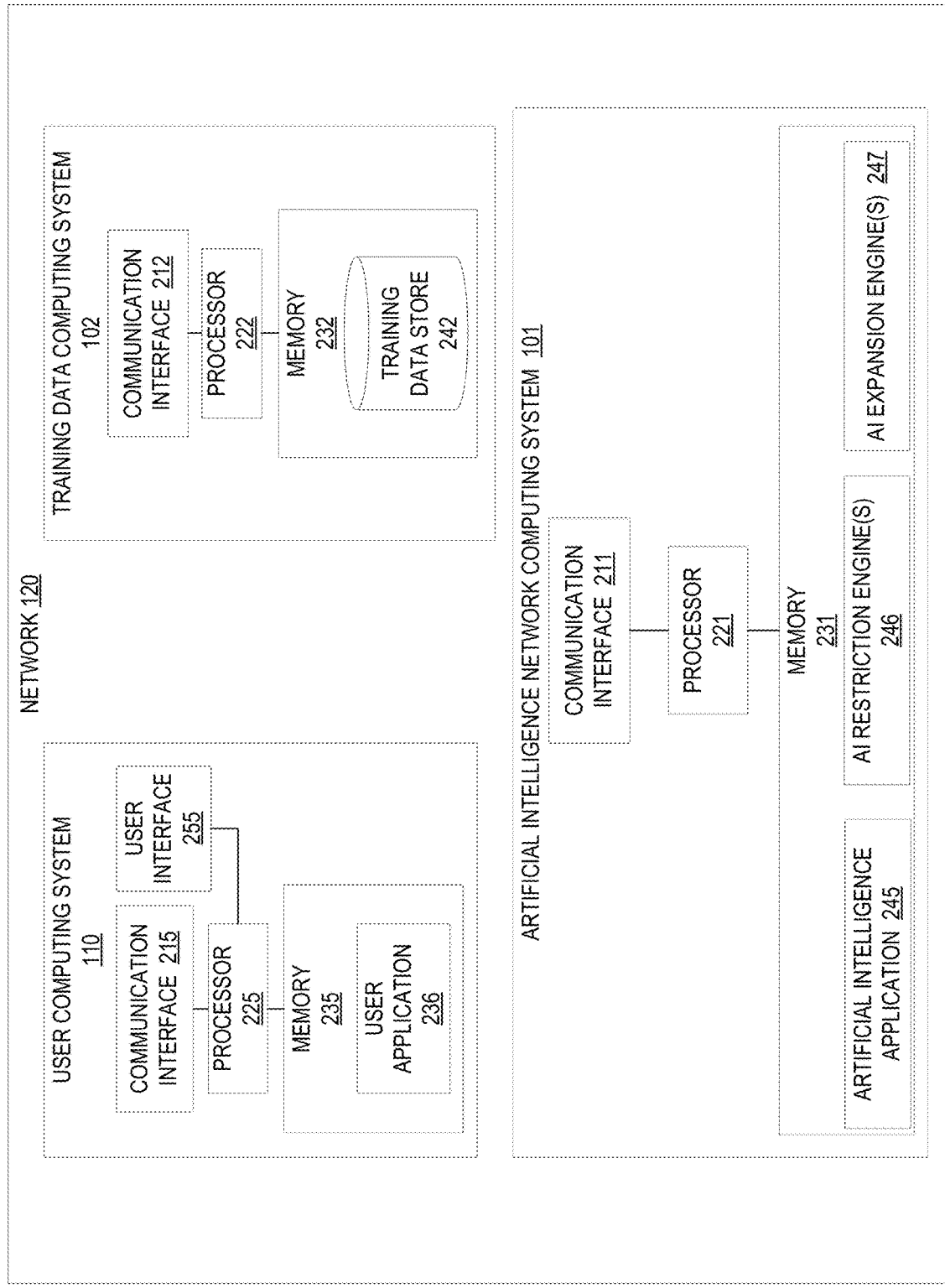
Figure 3:
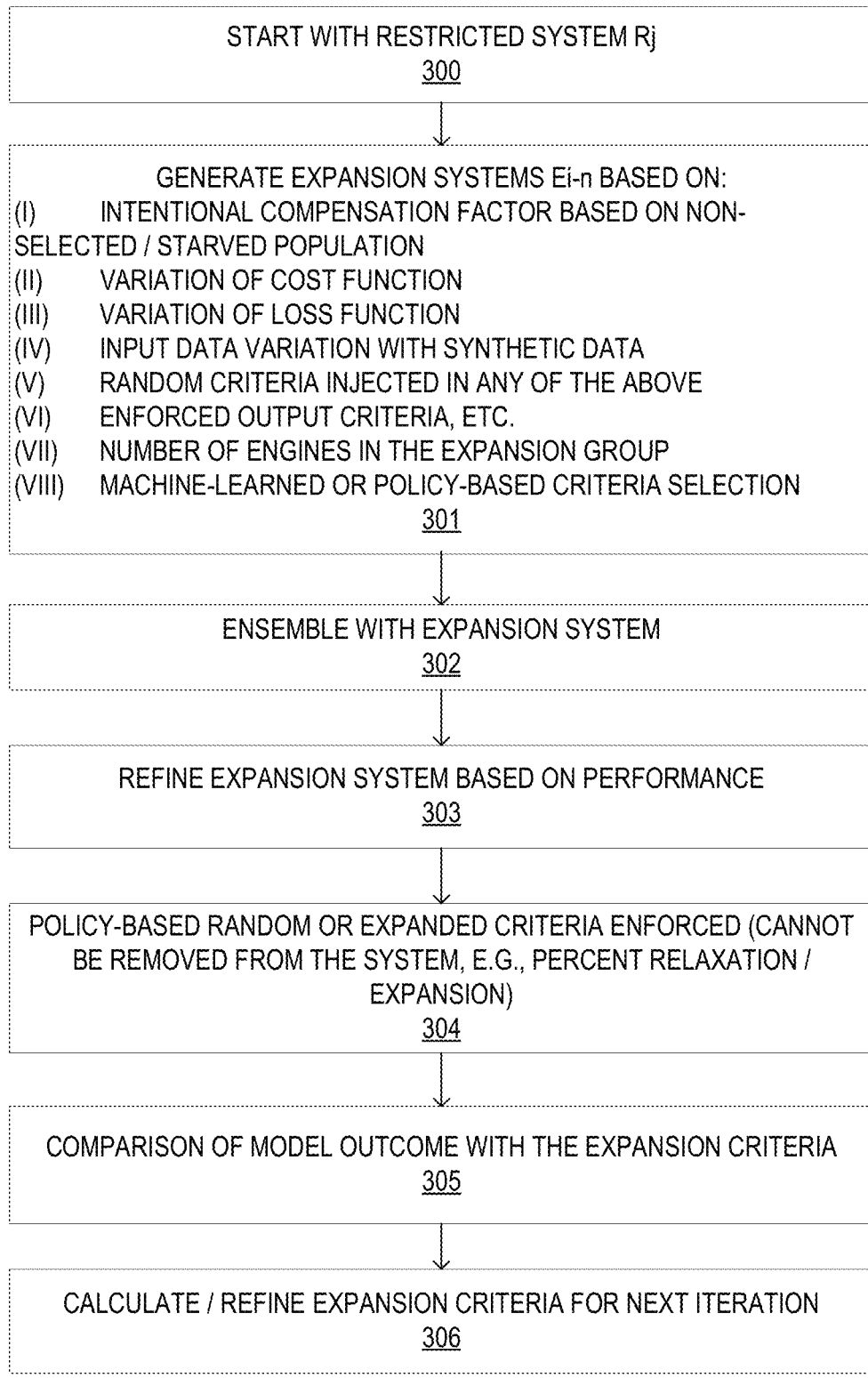
Figure 4:
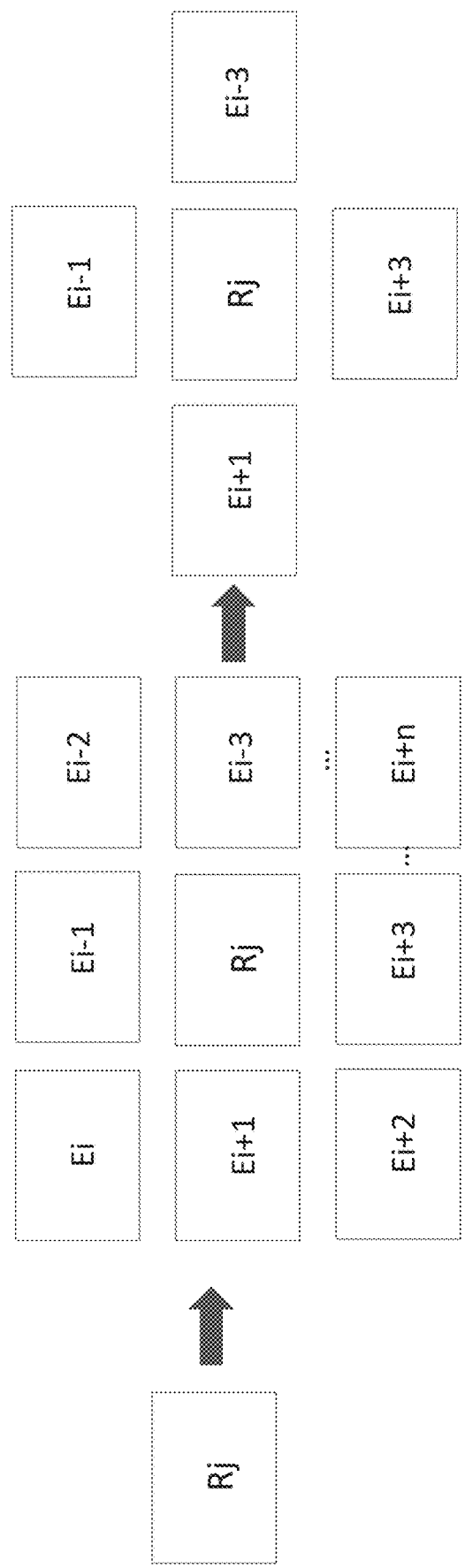
Figure 5:
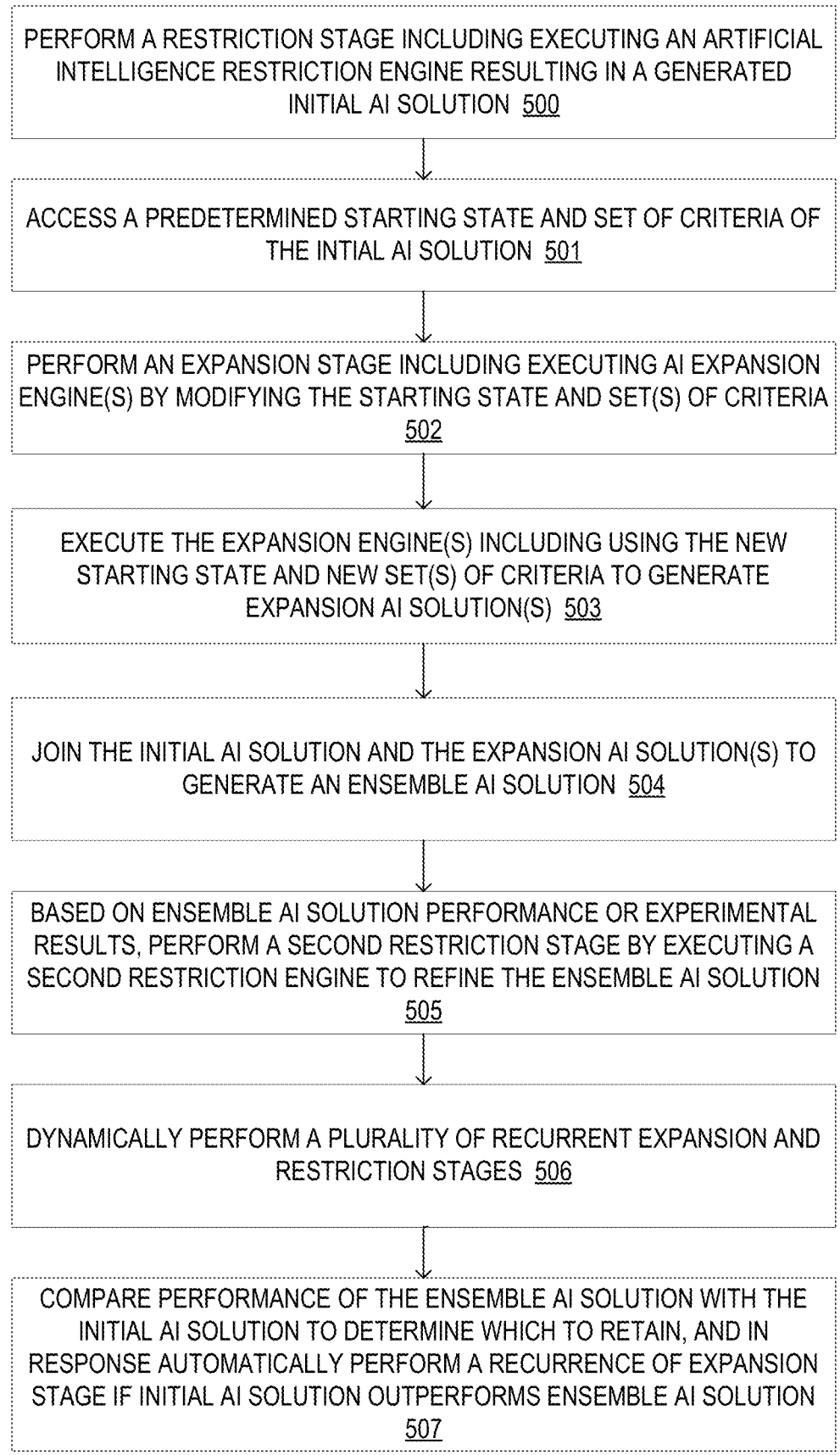

Having thus described embodiments of the disclosure in general terms, reference will now be made to the accompanying drawings, wherein:

FIG. 1 is a block diagram illustrating an operating environment, in accordance with some embodiments of the present disclosure;

FIG. 2 is a block diagram illustrating the artificial intelligence computing system, the training data computing system, and the user computing system in more detail, in accordance with some embodiments of the present disclosure;

FIG. 3 is a flowchart, in accordance with some embodiments of the present disclosure;

FIG. 4 is a combined flowchart and diagram, in accordance with some embodiments of the present disclosure; and FIG. 5 is a flowchart, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

The present disclosure is directed to a novel system for generating expansion artificial intelligence (AI) based decision making engines to improve overall AI solution fairness, reduce bias and reduce discrimination in outcomes. Embodiments perform a restriction stage that includes generating an initial AI solution, perform an expansion stage by generating a plurality of artificial intelligence expansion engines by modifying the starting state to determine a new starting state for each; modifying the set of criteria to determine a new set of criteria, using the new starting state and the new set of criteria to generate an expansion AI solution; and joining the initial AI solution of the restriction engine with the plurality of expansion AI solutions to generate an ensemble AI solution. This solution may be refined by a restriction stage and the expansion and/or restriction stages may be reiterated as desired.

Embodiments of the invention involve a system that leverages an artificial intelligence engine. "Artificial Intelligence" or "AI" as used herein may refer to machine intelligence demonstrated by the devices discussed herein, where the AI perceives its environment (or the environment in which its data lives) and takes actions that maximize its chance of successfully achieving its goals. In such regard, an AI system essentially mimics the cognitive functions of a human mind such as learning and problem solving.

"Entity" as used herein may refer to an individual or an organization that owns and/or operates an online system of networked computing devices, systems, and/or peripheral devices on which the artificial intelligence computing system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, and/or other resources used by the entity to generate and implement artificial intelligence engines. Accordingly, the entity system may comprise database servers, Internet-of-Things ("IoT") devices, compute nodes, networked terminals, smart devices (e.g., smart watches), and/or other types of computing systems or devices along with their associated applications.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

Artificial intelligence based systems are gaining popularity in recent years and have found a broad range of application areas. As the number and range of applications increase at a super-linear rate, societal impact of Artificial Intelligence based systems and the decisions made by them (or using them) are becoming important topics in the industries noted above and many others. Because most Artificial Intelligence systems leverage historical data for decision making, the historical biases, discriminatory practices, unfair practices and other negative historical practices are learned by the Artificial Intelligence engines. Justified by the historical data inputted into the Artificial Intelligence engines, the engines then can assert such negative historical practices on future applications at alarming rates.

Presently, there are no systems or solutions to guarantee fairness in Artificial Intelligence systems. Furthermore, the underlying negative historical practices and their overarching concepts such as fairness, biases, and the like, are also heavily debated in scientific and industry communities in order to isolate the negative practices from regular decision making processes. Making such distinctions and drawing effective lines between acceptable practices and unacceptable practices has proven very difficult in most use cases, and concepts being challenging is slowing down progress.

As an example of historical AI misuses, in some situations, human resources specialists have been using AI systems to select the best candidates to fill their positions. The decision making AI system is trained based on the top performing candidates. Such training is heavily biased on the prior decisions made, for example, by the company's senior management in promoting or hiring certain segments of the population. The AI based system enforces such a bias that it has learned from negative historical practices of the company, and as a result, continues and further justifies the biased and/or discriminatory practices.

As another example, of historical AI misuse, in certain situations, credit or loan decisions are made by AI-based systems. The decision making AI system uses historical data related to the previous loans and success rates. Because of the bias in the customer segments in the historical data, the new candidates are selected to match the criteria based on the training data bias. It is worth noting that this kind of practice may have very serious societal implications.

The above example of prior AI systems may be loosely considered as restriction-based systems or restriction engines. They rely purely on historical data and make locally optimal, globally non-optimal and discriminatory decisions.

As illustrated by these examples, it is a nontrivial matter to break the discriminatory patterns if the system uses the negative historical pattern data. In some cases, it is nearly impossible to distinguish bias. Rewarding previously discriminated segments has been proposed. In one embodiment, synthetic data (of previously discriminated segments) can be fed into the system for the system to reduce bias. However, the limits of success for such practices and other unforeseen biases introduced by such synthetic data is not well investigated.

Embodiments of the present disclosure provide a system that improves fairness of Artificial Intelligence to alleviate some of the above identified challenges. In exemplary embodiments, a novel Artificial Intelligence system leverages an enforced relaxation step to reduce the suboptimal and unfair decision making in present Artificial Intelligence systems. Generally speaking, embodiments of the invention provide a technique that includes several components and combines an Expansion Engine with a Restriction Engine.

Embodiments of the invention enforce expansion engines, where a collection (i.e., vector) of engines are structured with expanded criteria, such that (1) the AI system is forced to come up with random subgroups to be selected in predetermined percentages in the outcome; (2) the AI system is trained with expanded data with random subgroup data injected in different ratios and combinations in various options in the matrix; and (3) the AI system uses an optimization function that is expanded to include (i) additional criteria; (ii) variation of the base criteria; (iii) different criteria and the like.

Overall relaxation and expansion criteria are selected by the system and can be dynamically changed over time. The expanded systems can be restricted for performance improvement over time. Such restriction is then followed by another expansion/randomization step.

Turning to specific embodiments of the invention, during a restriction stage, a Restriction Engine of the Artificial Intelligence system executes and finds the best solution based on the criteria and design space provided. During an expansion stage, an Expansion Engine of the Artificial Intelligence system is forced to incorporate (i) random or expanded starting state; (ii) random or enforced criteria; and (iii) random or expanded input/output criteria. Further in the expansion stage, the Expansion Engine of the Artificial Intelligence system is forced to increase the number of engines in its decision making process.

The overall system, that is the Artificial Intelligence system, then combines the Expanded Engines and the Restriction Engines within the overall AI system for decision making processing. In other embodiments, the Restriction Engine(s) is/are forced to beat the Expansion Engine(s), and if it is unable to do so, then the Expansion Engine(s) take over the process within the AI system for subsequent decision making. In other words, the system may, on a regular basis, be forced to ensemble with expanded variations and beat the results of the expansions. If the system cannot beat the expansions, then the expanded system(s) take over.

Turning now to the figures, FIG. 1 is a block diagram illustrating an operating environment for the artificial intelligence computing system, in accordance with some embodiments of the present disclosure. In particular, the operating environment may include an artificial intelligence computing system 101, a training data computing system 102, and a user computing system 110 in operative communication with one another within a network 120. The network 120, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The artificial intelligence computing system 101 may be a computing system that uses a custom multi-objective algorithm to optimize an AI solution according to the methods described herein. Accordingly, the network computing system is typically a "headless" computing system such as a networked terminal or server, but may also be a desktop computer, laptop, smartphone or smart device, IoT device, or the like, or any combination thereof. The artificial intelligence computing system 101 may further host and/or operate the artificial intelligence engine(s) which have been constructed using the process described herein.

The operating environment may further comprise training data computing system 102, which may host various types of training data to be used in training the artificial intelligence engine(s) generated and/or hosted on the artificial intelligence computing system 101. In an exemplary embodiment, the artificial intelligence computing system 101 may be using an artificial intelligence solution using voice recognition to detect potentially malicious attempts to gain unauthorized access to a user's account. In such embodiments, the training data computing system 102 may comprise training data which includes various voice samples (e.g., young, old, male, female, or accented voices, or the like). By training the artificial intelligence engine(s) using the voice training data, the system may be able to enhance the artificial intelligence engine(s)' ability to determine positive and negative matches The operating environment may further comprise a user computing system 110 which may be in operative communication with the other computing systems within the network 120. In particular, the user computing system 110 may allow a user to access, add, and/or manage the training data within the training data computing system 102. The user computing system 110 may also access the artificial intelligence computing system 101 to define various parameters, initial conditions, modify artificial intelligence engine architecture, set training parameters, or the like.

It should be understood by those having ordinary skill in the art that although the artificial intelligence computing system 101, the training data computing system 102, and/or the user computing system 110 are depicted as single units, each of the depicted components, or sub-components therein, may represent multiple units. For instance, in some embodiments, a given computing system as depicted in FIG. 1 may represent multiple systems configured to operate in a distributed fashion (e.g., the artificial intelligence computing system 101 may represent multiple computing systems which host and/or generate artificial intelligence engines). In other embodiments, the functions of multiple computing systems may be accomplished by a single system. For example, the functions of the training data computing system 102 may also be executed by the artificial intelligence computing system 101.

FIG. 2 is a block diagram illustrating the artificial intelligence computing system 101, the training data computing system 102, and the user computing system 110 in more detail, in accordance with some embodiments of the present disclosure. The artificial intelligence computing system 101 may comprise a processor 221 communicably coupled to such devices as a communication interface 211 and a memory 231. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The artificial intelligence computing system 101 may use the communication interface 211 to communicate with other devices over the network 120. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the artificial intelligence computing system 101 may comprise an artificial intelligence application 245, AI restriction engine(s) 246 and/or AI expansion engine(s) 247. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The AI application 245 may comprise executable code for generating AI engines. To this end, the artificial intelligence application 245 may cause the artificial intelligence computing system 101 to, via the communication interface 211, communicate with the user computing system 110, and/or the training data computing system 102 to pull training data, accept user inputs for modification of the AI criteria and/or setting of various other parameters, or the like.

The training data computing system 102 may also comprise a processor 222 communicatively coupled with such devices as a communication interface 212 and a memory 232. The memory 232 of the training data computing system 102 may comprise a training data store 242, which may comprise various types of data used to train artificial intelligence engines. In this regard, the training data may be accessed by the artificial intelligence computing system 101, and/or the user computing system 110 to train the artificial intelligence engines stored thereon. In an exemplary embodiment, the training data may comprise data related to detection of the identity of authorized users and/or unauthorized users, such as voice samples, facial image samples, account activity data, user behavior data, or the like. The training data may further comprise user data across multiple different segments. For instance, the training data may be segmented according to transaction context (e.g., ATM transactions, online transactions, mobile transactions, or the like) and/or by customer segments (e.g., customers segmented by sectors of population, geography, retail or business sectors, VIP segments, or the like). In addition, the training data may comprise adversarial training data which may be used to train AI engines in adversarial conditions. For instance, the AI engines may be presented with user behavior data which contains suspicious or potentially malicious activity. Using such training data, the AI engines may be refined and/or optimized to successfully recognize the suspicious user behavior.

The user computing system 110 may also comprise a processor 225 in operative communication with a communication interface 215 and a memory 235. The user computing system 110 may further comprise a user interface 255, which may comprise the hardware and software implements to accept input from and provide output to the user. The user interface 255 may comprise hardware such as a display, audio output devices, projectors, and the like, or input devices such as keyboards, mice, sensors, cameras, microphones, biometric input devices (e.g., fingerprint readers), and the like. The user interface 255 may further comprise software such as a graphical or command-line interface through which the user may provide inputs and/or receive outputs from the user computing system 110. It should be understood that the display on which the user interface 255 is presented may include an integrated display (e.g. a tablet or smartphone screen) within the user computing system 110, or an external display device (e.g. a computer monitor or television).

The memory 232 of the user computing system 110 may comprise a user application 236 stored thereon. The user application 236 may allow a user to access the artificial intelligence computing system 101 to manually tweak the AI engine criteria stored therein. For instance, in typical embodiments, the system has predetermined performance metrics which may be input by users.

Referring concurrently now to FIGS. 3 and 4, a flowchart illustrating a method according to embodiments of the invention is shown in FIG. 3 and a combined flowchart and diagram are shown in FIG. 4. The first step of FIG. 3, as represented by block 300, is to start with a restricted system Rj, which is also shown in the FIG. 4. As discussed elsewhere, the restricted system may provide an initial AI solution with corresponding start states and criteria.

The next step, as represented by block 301, is to generate a number of expansion systems (Ei-n as shown in FIG. 4) based on one or more criteria, such as (i) intentional compensation factor based on non-selected/starved population, (ii) variation of cost function, (iii) variation of loss function, (iv) input data variation with synthetic data, (v) random criteria injected in any of the above, (vi) enforced output criteria, etc., (vii) number of engines in the expansion group of AI engines, and (viii) machine-learned or policy-based criteria selections.

The next step, as represented by block 302, is to ensemble the restricted system solution with the expansion system. Then, the result is refined based on the performance of the result, as represented by block 303. Next, as represented by block 304, policy-based random or expanded criteria may be enforced. That is, such criteria may be restricted from removal from the system, e.g., percent relaxation (i.e., expansion). Next, as represented by block 305, the model outcome is compared with the expansion criteria, and finally, the expansion criteria for the next iteration (or recurrence of the process) is calculated or refined as represented by block 306.

Referring now to FIG. 5, a flowchart illustrates a method according to embodiments of the invention. The first step, as represented by block 500, is to perform a restriction stage including executing an AI restriction engine. This results in a generated initial AI solution. In other embodiments, the system does not perform the restriction stage, but rather, the system accesses previously performed restriction stage results including a previously determined restriction AI solution.

The next step, as represented by block 501, is to access a predetermined starting state and set of criteria for the initial AI solution.

The next step is to perform an expansion stage, as presented by block 502. This may include modifying the starting state and/or the set(s) of criteria. Next, the expansion engine(s) are executed, including by using the new starting state and new sets of criteria to generate an expansion AI solution or solutions, as represented by block 503.

Next, and as a final step in some embodiments, the system performs block 504, which is joining or "ensembling" the initial AI solution and the expansion AI solution(s) to generate an ensemble AI solution. In some embodiments, the system does not join the initial AI solution and the expansion AI solution, but rather merely uses the expansion AI solution.

Some embodiments include performing the next step, which is represented by block 505, and is to restrict the ensemble AI solution based on ensemble AI solution performance or experimental results. This "second" restriction stage may be based on policies or rules as well and results in a refined ensemble AI solution.

Some embodiment include performing the next step, which is represented by block 506, and is to dynamically perform a plurality of recurrent expansion and restriction stages. This may be done periodically or on demand. The system may also regularly test the results of the AI solution being used to determine whether another iteration or recurrence of the process described herein is necessary. In various embodiments, running another iteration or performing a recurrence may include performing another iteration of the expansion stage alone, may include performing another iteration of the restriction stage alone, or may include performing another iteration of the expansion stage as well as another iteration of the restriction stage.

Some embodiments include performing the next step, which is represented by block 507, and is to compare performance of the ensemble AI solution with the initial AI solution to determine which to retain (or use). In response to determining that the initial AI solution outperforms the ensemble AI solution, the system may automatically perform a recurrence of the expansion stage, the restriction stage or both.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating expansion artificial intelligence (AI) based decision making engines to improve overall AI solution fairness, reduce bias and reduce discrimination in outcomes, comprising:
a processor;
a communication interface; and
a memory having executable code stored thereon, wherein the executable code, when executed by the processor, causes the processor to:
perform a restriction stage comprising executing an artificial intelligence restriction engine, such that when executed, the AI restriction engine causes the processor to:
generate an initial AI solution;
access a predetermined starting state of the initial AI solution;
access a predetermined set of criteria to be applied during AI optimization of the initial AI solution;
perform an expansion stage by generating a plurality of artificial intelligence expansion engines by, for each AI expansion engine:
modifying the starting state to determine a new starting state for each of the plurality of AI expansion engines; and
modifying the set of criteria to determine a new set of criteria for each of the plurality of AI expansion engines;
for each of the plurality of AI expansion engines, execute the expansion engine, that when executed, causes the processor to:
use the new starting state and the new set of criteria to generate an expansion AI solution; and
join the initial AI solution of the restriction engine with the plurality of expansion AI solutions of the plurality of expansion engines to generate an ensemble AI solution.

2. The system of claim 1, wherein the executable code further causes the processor to:
perform a second restriction stage by executing a second restriction engine to refine the ensemble AI solution, resulting in a refined ensemble AI solution.

3. The system of claim 2, wherein the second restriction engine refines the ensemble AI solution based on ensemble AI solution performance or experimental results.

4. The system of claim 1, wherein the executable code further causes the processor to:
dynamically modify the set of criteria to determine the new sets of criteria for the plurality of each of the plurality of AI expansion engines based on:
(i) a number of the plurality of AI expansion engines, (ii) policies for at least a portion of the new sets of criteria, (iii) machine learning for at least a portion of the new sets of criteria, (iv) randomly generating at least a portion of the new sets of criteria, (v) enforcing an output set of criteria, (vi) modifying optimization criteria, and/or (vii) modifying a champion/challenger mode.

5. The system of claim 1, wherein the executable code further causes the processor to:
modify the set of criteria to determine a new set of criteria for each of the plurality of AI expansion engines by:
inserting an (i) intentional compensation factor based on non-selected or starved population, (ii) variation of a cost function, (iii) variation of a loss function, and/or (iv) variation of input data by synthetic data.

6. The system of claim 5, wherein the executable code further causes the processor to:
modify the set of criteria to determine a new set of criteria for each of the plurality of AI expansion engines by:
inserting random criteria into one or more of (i) intentional compensation factor, (ii) cost function variation, (iii) loss function variation, and/or (iv) synthetic data variation of input data.

7. The system of claim 1, wherein the executable code further causes the processor to:
dynamically perform a plurality of recurrent expansion stages and restriction stages to determine dynamic sets of expansion criteria and restriction criteria to further refine the ensemble AI solution.

8. The system of claim 7, wherein dynamically performing the plurality of recurrent expansion and restriction stages is based at least in part on a set of overall system criteria comprising expansion degrees, restriction degrees, and/or recurrence cycle lengths.

9. The system of claim 7, wherein the executable code further causes the processor to:
calculate a next iteration expansion profile and a next iteration restriction profile;
wherein the next iteration expansion profile comprises second new sets of expansion criteria for application during a next expansion stage; and
wherein the next iteration restriction profile comprises new sets of restriction criteria for application during a next restriction stage.

10. The system of claim 1, wherein the executable code further causes the processor to:
compare performance of the refined AI solution to the initial AI solution from the restriction engine;
if performance of the refined AI solution surpasses performance of the initial AI solution, retain the refined AI solution as a working solution; and
if performance of the initial AI solution surpasses performance of the refined AI solution, use the initial AI solution as the working solution.

11. The system of claim 10, wherein the executable code further causes the processor to:
in response to using the initial AI solution as the working solution, automatically perform recurrence of the expansion stage to determine second new sets of criteria for a new plurality of AI expansion engines.

12. A controller for generating expansion artificial intelligence (AI) based decision making engines to improve overall AI solution fairness, reduce bias and reduce discrimination in outcomes, the controller comprising a processor communicatively coupled to a communication interface and a memory having executable instructions stored thereon, wherein the executable code, when executed by the processor, causes the processor to:
perform a restriction stage comprising executing an artificial intelligence restriction engine, such that when executed, the AI restriction engine causes the processor to:
generate an initial AI solution;
access a predetermined starting state of the initial AI solution;
access a predetermined set of criteria to be applied during AI optimization of the initial AI solution;
perform an expansion stage by generating a plurality of artificial intelligence expansion engines by, for each AI expansion engine:
modifying the starting state to determine a new starting state for each of the plurality of AI expansion engines; and
modifying the set of criteria to determine a new set of criteria for each of the plurality of AI expansion engines;
for each of the plurality of AI expansion engines, execute the expansion engine, that when executed, causes the processor to:
use the new starting state and the new set of criteria to generate an expansion AI solution; and
join the initial AI solution of the restriction engine with the plurality of expansion AI solutions of the plurality of expansion engines to generate an ensemble AI solution.

13. The controller of claim 12, wherein the executable code further causes the processor to:
perform a second restriction stage by executing a second restriction engine to refine the ensemble AI solution, resulting in a refined ensemble AI solution.

14. The controller of claim 13, wherein the second restriction engine refines the ensemble AI solution based on ensemble AI solution performance or experimental results.

15. The controller of claim 12, wherein the executable code further causes the processor to:
dynamically modify the set of criteria to determine the new sets of criteria for the plurality of each of the plurality of AI expansion engines based on:
(i) a number of the plurality of AI expansion engines, (ii) policies for at least a portion of the new sets of criteria, (iii) machine learning for at least a portion of the new sets of criteria, (iv) randomly generating at least a portion of the new sets of criteria, (v) enforcing an output set of criteria, (vi) modifying optimization criteria, and/or (vii) modifying a champion/challenger mode.

16. The controller of claim 12, wherein the executable code further causes the processor to:
modify the set of criteria to determine a new set of criteria for each of the plurality of AI expansion engines by:
inserting an (i) intentional compensation factor based on non-selected or starved population, (ii) variation of a cost function, (iii) variation of a loss function, and/or (iv) variation of input data by synthetic data.

17. The controller of claim 16, wherein the executable code further causes the processor to:
modify the set of criteria to determine a new set of criteria for each of the plurality of AI expansion engines by:
inserting random criteria into one or more of (i) intentional compensation factor, (ii) cost function variation, (iii) loss function variation, and/or (iv) synthetic data variation of input data.

18. The controller of claim 12, wherein the executable code further causes the processor to:
dynamically perform a plurality of recurrent expansion stages and restriction stages to determine dynamic sets of expansion criteria and restriction criteria to further refine the ensemble AI solution.

19. The controller of claim 18, wherein dynamically performing the plurality of recurrent expansion and restriction stages is based at least in part on a set of overall system criteria comprising expansion degrees, restriction degrees, and/or recurrence cycle lengths.

20. A computer-implemented method for generating expansion artificial intelligence (AI) based decision making engines to improve overall AI solution fairness, reduce bias and reduce discrimination in outcomes, the method comprising:
performing a restriction stage comprising executing an artificial intelligence restriction engine, such that when executed, the AI restriction engine causes the processor to:
generate an initial AI solution;
accessing a predetermined starting state of the initial AI solution;
accessing a predetermined set of criteria to be applied during AI optimization of the initial AI solution;
performing an expansion stage by generating a plurality of artificial intelligence expansion engines by, for each AI expansion engine:

modifying the starting state to determine a new starting state for each of the plurality of AI expansion engines;
modifying the set of criteria to determine a new set of criteria for each of the plurality of AI expansion engines;
for each of the plurality of AI expansion engines, executing the expansion engine, that when executed, causes the processor to:
use the new starting state and the new set of criteria to generate an expansion AI solution; and
joining the initial AI solution of the restriction engine with the plurality of expansion AI solutions of the plurality of expansion engines to generate an ensemble AI solution.

\* \* \* \* \*